W. P. TARRANT.
POURING POT.
APPLICATION FILED MAR. 26, 1913.
1,086,796.
Patented Feb. 10, 1914.
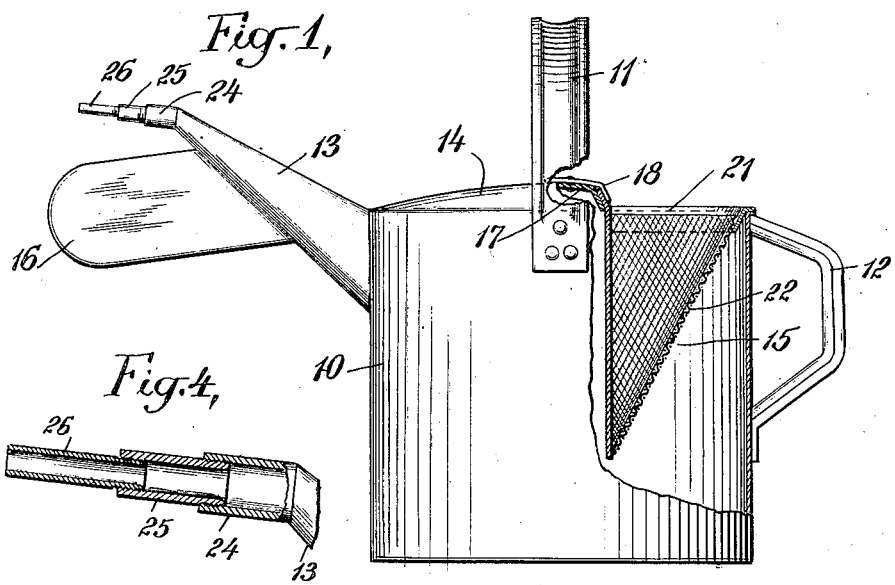
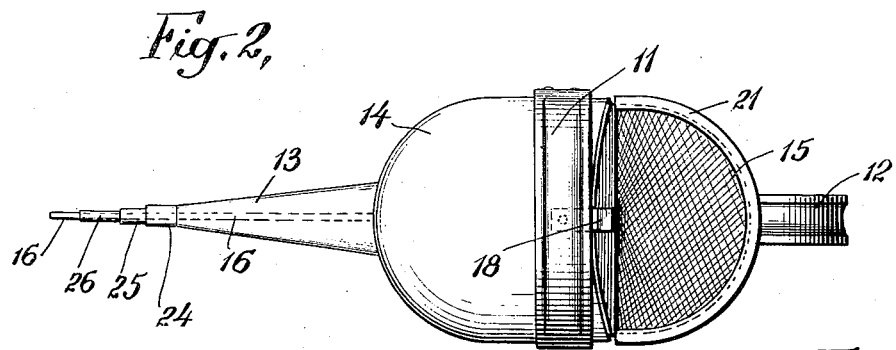
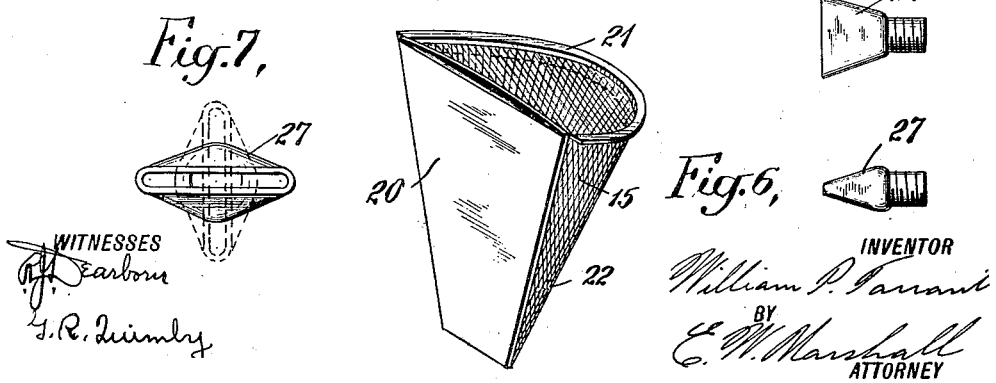
WITNESSES
INVENTOR
William P. Tarrant
BY
E. W. Marshall
ATTORNEY

UNITED STATES PATENT OFFICE.

WILLIAM P. TARRANT, OF SARATOGA SPRINGS, NEW YORK, ASSIGNOR TO TARRANT MANUFACTURING CO., OF SARATOGA SPRINGS, NEW YORK, A CORPORATION OF NEW YORK.

POURING-POT.

1,086,796.

Specification of Letters Patent.

Patented Feb. 10, 1914.

Application filed March 26, 1913. Serial No. 756,858.

*To all whom it may concern:*

Be it known that I, WILLIAM P. TARRANT, a citizen of the United States, and a resident of Saratoga Springs, in the county of Saratoga and State of New York, have invented certain new and useful Improvements in Pouring-Pots, of which the following is a specification, reference being had to the accompanying drawings, forming a part thereof.

My invention relates to pouring pots and particularly to such as are adapted for pouring material into the crevices of a brick or block pavement. As the substances generally used for such purposes, such for example as asphalt are in liquid form only when hot, this device is especially designed to be used with hot materials.

One object of my invention is to provide a simple and durable device of the character above described that shall embody means for so guiding the device when it is in use as to direct a stream of liquid filler into a crevice and thereby economize the material and facilitate the operation.

Another object is to provide a simple nozzle which can be used effectively with asphalt, coal, tar, etc., and which may be made to deliver streams of different characters.

Other objects of my invention will be set forth hereinafter.

I will describe my invention in the following specification and point out the novel features thereof in appended claims.

Referring to the drawings Figure 1 is a side elevation of a pouring pot embodying my invention, the side being broken away to disclose the strainer within. A plan view of the pot is shown in Fig. 2. Fig. 3 is a perspective view of the strainer apart from the pot. Fig. 4 is a sectional detail on a larger scale of the nozzle of the pot shown in Figs. 1 and 2. Detail views of a modified form of nozzle tip are shown in Figs. 5, 6 and 7.

Like characters of reference designate corresponding parts in all the figures.

10 is the body of a pot, which is adapted to contain a liquid such as molten asphalt, and is provided with handles 11 and 12, a spout 13, a hood 14 and a removable strainer 15. The spout 13 has a flat guide projection or wing 16 which extends below and slightly beyond the end of the spout and is preferably rounded at its outer end as shown in Fig. 1. The body of the pot is preferably elliptical in transverse section and may consequently be carried and used with great facility so that one man can handle a pot of larger capacity. The handle 12 and the spout and guide are located in the central plane of the pot, determined by the longitudinal axis of the elliptical section of the body.

The hood 14 is provided with a flange 17 to which is secured a spring latch 18. The strainer 15 is comprised of a plate 20 which extends into the pot and is flanged to fit the flange 17 of the hood, a semicircular spreader 21 and a tapering screen 22. The spreader is secured at its ends to the upper corners of the plate 20 and the screen is secured to the plate edges except at the top where it is secured to the spreader. The dimensions of the strainer are such that it completely fills the opening of the pot, and the spreader rests on the rim of the pot, the plate flange being held in place by the spring 18.

At the end of the spout is a nozzle which comprises an internally threaded tubular projection or pipe connection 24 brazed or welded to the spout and removable members 25 and 26. These members are pipe sections of smaller size, the member 25 being screwed into the connection 24 and the member 26 into the member 25. One or both of the members may be omitted or both may be used depending upon the rate of discharge and the size of the stream desired.

The connections 25 and 26 may be replaced by a shaping nozzle 27 which has a flattened outlet adapted to be turned either parallel or transverse to the central plane of the pot (see Fig. 7). Thus either a broad thin stream or a narrow thick stream may be produced.

The pot illustrated is adapted for use as a brick filling pot, that is a suitable liquid such as asphalt in a molten state may be poured from it into the crevices and joints in brick or block pavements. The flanged head 14 prevents slopping of the hot liquid on the operator and all the material is strained through the screen 22 when it is introduced into the pot which keeps out foreign substances. The screen may be removed and cleaned without difficulty and without the use of tools. The spout is preferably made integral with the body and is large enough at the point where it joins the body to feed an adequate amount of liquid to the nozzle insuring a perfect and continuous flow therefrom without too great a pressure. The internally threaded member 24 and pipe connections or nipples 25 and 26 which may form parts of the nozzle are arranged to give outlets of three different sizes. As they are simple threaded pipe nipples they can be easily cleaned by simply putting them in a fire and burning off any of the material which may congeal upon them. The guide 16 is preferably welded to the under side of the spout and extends downwardly and outwardly from it at an angle which allows it to follow the crevice or joint in the pavement thus keeping the flow of the material from the vessel where it is wanted without depending upon the eyes and hand of the operator. By this means the material is economized and is at the same time prevented from spreading over the pavement where it is not wanted.

The pot is not limited to any particular service nor is its use confined to liquid asphalt or pitch.

Variations in size and arrangement of parts may be effected within the spirit and scope of my invention.

What I claim is:

1. A hand pouring pot having a handle and a spout at opposite sides thereof, a flat guide plate rigidly affixed to said spout and projecting from the side thereof opposite the pot.

2. A hand pouring pot comprising a flattened cylindrical body, a spout extending outwardly therefrom in the central plane of the flattened body and a flat guide plate extending outwardly from the spout beyond its end in said same central plane.

3. A hand pouring pot comprising a flattened cylindrical body, a spout extending outwardly therefrom in the central plane of the flattened body, removable nozzle members in the outer end of the spout and a flat guide plate extending outwardly from the spout beyond its end, a handle extending from the side of the pot opposite to the spout, said nozzle members, guide plate and handle being in said same central plane.

4. A pouring pot comprising a body having a hood and handles, a spout having a flat guide projection extending outwardly from its under side beyond the end of the spout, a strainer comprising a plate extending inwardly from the hood, a curved spreader fitting the edge of the body and a screen secured to the sides and inner ends of the plate and to the spreader and a spring latch on the hood for holding the screen in position.

In witness whereof, I have hereunto set my hand this 22 day of March in the year 1913.

WILLIAM P. TARRANT.

Witnesses:
 W. P. BUTLER,
 W. R. WILSON.